T. M. DANIELS & J. C. HOLSCHEMACHER.

NUT TAPPING MACHINE.

APPLICATION FILED SEPT. 16, 1915.

Reissued Mar. 14, 1916.

14,086.

3 SHEETS—SHEET 1.

WITNESSES:

E. G. Jacker

L. A. Myers

INVENTORS:

Thomas M. Daniels

Julius C. Holschemacher

BY Symmerwell Bradley Lechner & Fokes

ATTYS

T. M. DANIELS & J. C. HOLSCHEMACHER.

NUT TAPPING MACHINE.

APPLICATION FILED SEPT. 16, 1915.

Reissued Mar. 14, 1916. 14,086.

3 SHEETS—SHEET 2.

WITNESSES:
E. T. Jacker
L. A. Myers

INVENTORS:
Thomas M. Daniels
Julius C. Holschemacher
Symmetrell & Bradley Lickner & Fowler
ATT'YS

T. M. DANIELS & J. C. HOLSCHEMACHER.

NUT TAPPING MACHINE.

APPLICATION FILED SEPT. 16, 1915.

Reissued Mar. 14, 1916. 14,086.

3 SHEETS—SHEET 3.

WITNESSES:

E. D. Jacker

L. A. Myers

INVENTORS:

Thomas M. Daniels

Julius C. Holschemacher

BY by Synnestvedt & Bradley Lechner & Forbes

ATT'YS

UNITED STATES PATENT OFFICE.

THOMAS MARION DANIELS AND JULIUS C. HOLSCHEMACHER, OF CHICAGO, ILLINOIS, ASSIGNORS, BY MESNE ASSIGNMENTS, TO DANIELS SAFETY DEVICE COMPANY, OF CHICAGO, ILLINOIS, A CORPORATION OF ILLINOIS.

NUT-TAPPING MACHINE.

14,086. Specification of Reissued Letters Patent. Reissued Mar. 14, 1916.

Original No. 1,141,779, dated June 1, 1915, Serial No. 862,876. Application for reissue filed September 16, 1915. Serial No. 51,120.

*To all whom it may concern:*

Be it known that we, THOMAS M. DANIELS and JULIUS C. HOLSCHEMACHER, citizens of the United States, and residents of Chicago, in the county of Cook and State of Illinois, have invented certain new and useful Improvements in Nut-Tapping Machines, of which the following is a specification.

Our invention relates to machines for producing the screw-threads in nuts already provided with the bores, and the main object is to provide such a machine which accomplishes this result automatically and continuously.

A further object is to insure a uniform thread entirely through the nut, this involving passing a tap entirely through a nut, and afterward returning the same to initial, nut engaging, position.

A further object is to provide such a machine which is very speedy in operation and, therefore, of great capacity.

A further object is to provide such a machine which is readily adaptable to various sizes of nuts, and to various pitches of threads; and further objects are to provide such machines which are simple in construction, positive in operation, self-lubricating, and comparatively inexpensive.

Our invention is fully described in the following specification, of which the accompanying drawings form a part, in which like parts are designated by the same reference characters in each of the views, and in which:—

Figure 4 is an enlarged section on the line 4—4 of Figure 2;

Figure 5 is a similar section on the line 5—5 of Figure 2; and

Figure 6 is a similar section on the line 6—6 of Figure 1.

Figure 1:
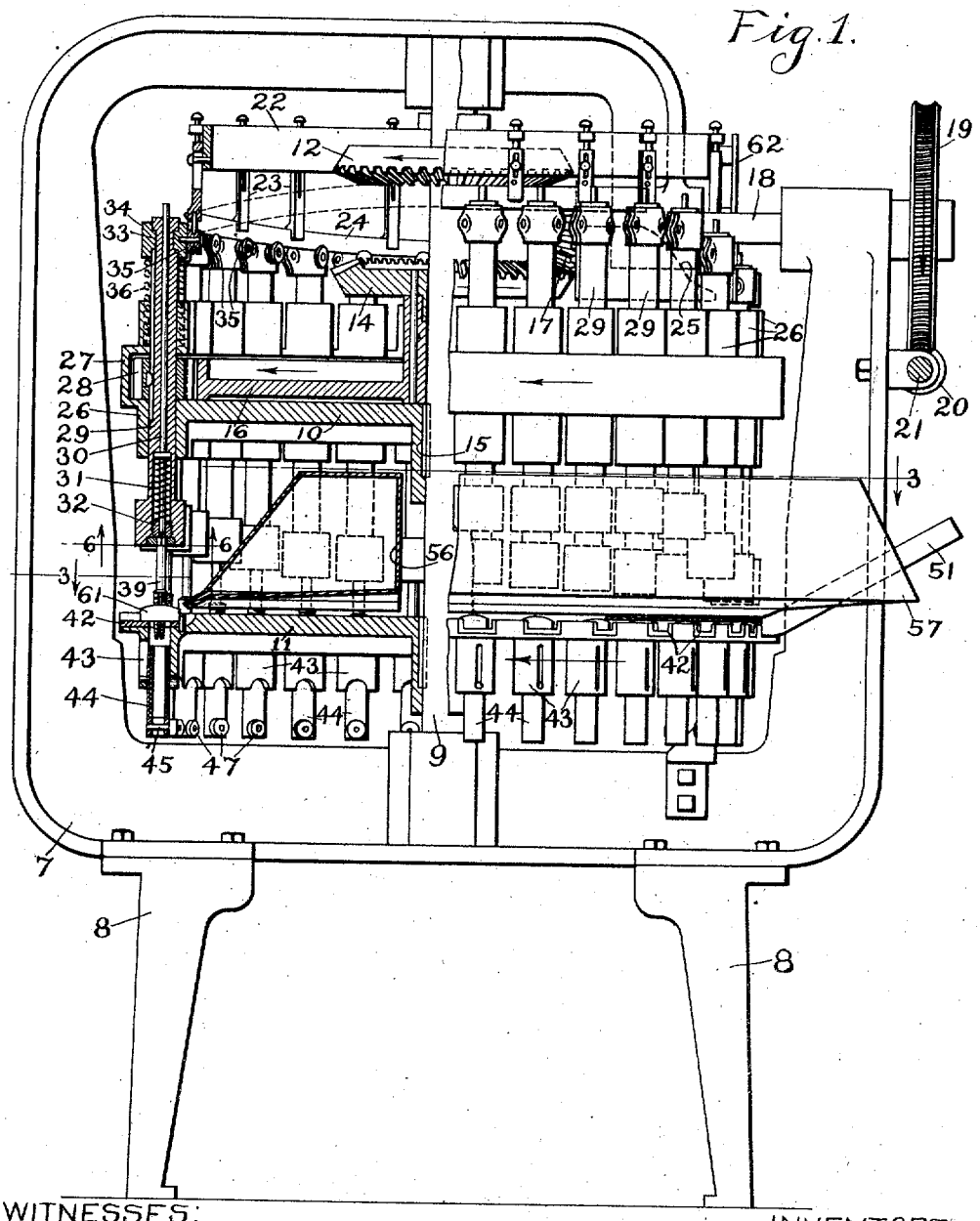
Figure 1 is a side elevation of our nut tapping machine, partly in section on the line 1—1 of Figure 3.

In the drawings forming a part of this application we have shown a present preferred form of embodiment of our invention, comprising a suitable frame 7, legs 8, a central, vertical, shaft 9, carrying two carriers 10 and 11 keyed thereto, two bevel-gears 12 and 14, the former keyed thereto and the latter keyed, as shown at 15, to a spur-gear 16, a bevel pinion 17 enmeshed with said bevel-gears and revoluble with a counter-shaft 18 having a worm-gear 19 on its outer end enmeshed with a worm 20 on the drive-shaft 21, and it will be seen that the carriers 10 and 11 and bevel gear 12 revolve with the shaft 9, whereas the bevel-gear 14 and spur-gear 16 revolve in the opposite direction.

Figure 2:
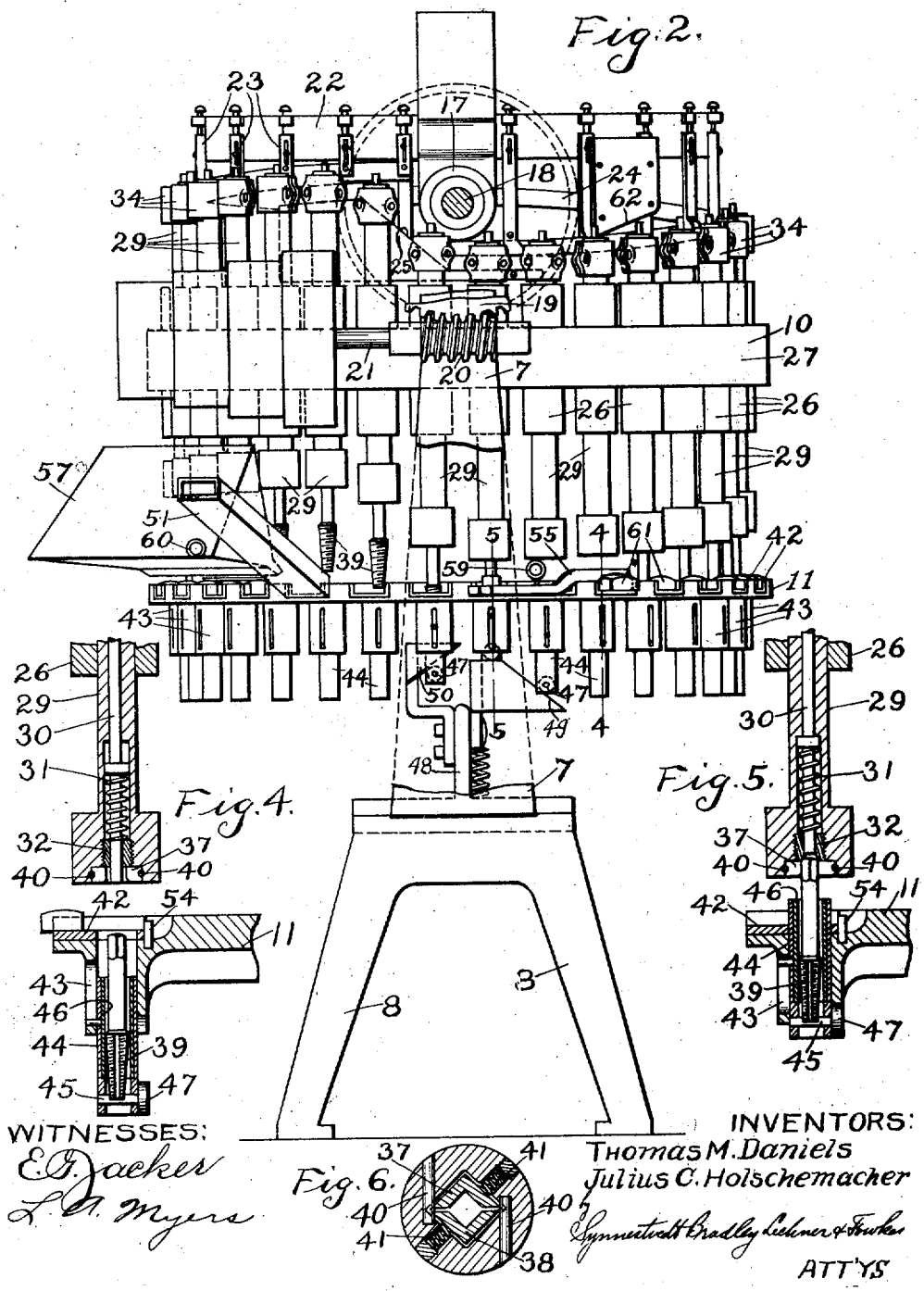
Figure 2 is a side view thereof, partly broken away.

At the top of the machine is a support 22 for a plurality of hangers 23 carrying a cam 24 at their lower ends, said hangers being individually adjustable, in any desired manner, whereby the inclination of the cam 24 may be adjusted with respect to the support 22, this adjustment being a material factor in adapting the machine to different pitches of threads in the nuts, and we also provide a separate cam 25, Figure 2, bridging the gap between the ends of the metal band forming the cam 24.

The carrier 10 is provided with a plurality of vertically arranged tubular guides 26 on the periphery thereof and extending above and below the same, being enlarged intermediate the height of each guide, as shown at 27, Figure 1, to receive a pinion 28 enmeshed with the spur-gear 16, a spindle 29 being slidably keyed within each pinion; each spindle has a central bore therethrough for a rod 30 normally held in uppermost position by means of a spring 31 bearing upon a flange thereon and upon a threaded plug 32 in an enlarged head of the spindle, said spindle being peripherally grooved in its upper end, at 33, to receive a collar 34 provided with a roller 35 grooved to engage with the lower edge of the cam 24, normally, and with the cam 25 under conditions to be described, and we may, if desired, employ a spring 36, indicated in dotted lines in Figure 1, for maintaining the spindle in contact with the cam 24.

The lower enlarged head of each spindle is recessed to receive two members 37 and 38 of a clutch for a tap 39, said members being held in osition by means of pins 40 and springs 41, Eigure 6 and the interior, lower, edges of which are rounded to permit the entry of the angular end of the tap, this being clearly shown in Figures 4 and 5.

The carrier 11 has a plurality of recesses formed in the upper face thereof in absolute register with the positions of corresponding spindles, a nut receiving block 42 being arranged in each recess, and each of said blocks is removable whereby it may be substituted by another adapted for a larger or smaller nut, and whereby it may be turned upside down for a reason later explained. Beneath each of the said blocks 42 is a tubular, slotted, guide 43 for a tube 44 provided with a pin engaged in said slot to prevent the rotation of the tube in the guide but permitting its vertical movement therein, a transverse rod 45 being provided in the lower end of each tube 44 to permit shavings to fall therethrough but preventing a corresponding bit from falling therethrough, each tap being preferably transversely grooved, as shown in Figures 1, 4 and 5, at its lower end to engage with said rod 45 and thus maintain its relationship with the clutch from which it has been forced, as will be later explained. We also provide a supplemental tube 46 within each tube 45 which is adapted to be substituted by another of a proper internal diameter when larger or smaller taps are employed, and we also provide a roller 47 at the inner side of the lower, exterior, end of each tube 44.

Mounted upon a suitable support 48, Figure 2, is a cam or incline 49 arranged in the path of the rollers 47, and adjacent thereto is a complemental cam or incline 50 also in the path of said rollers, and the reason for which will be later set forth.

Figure 3:
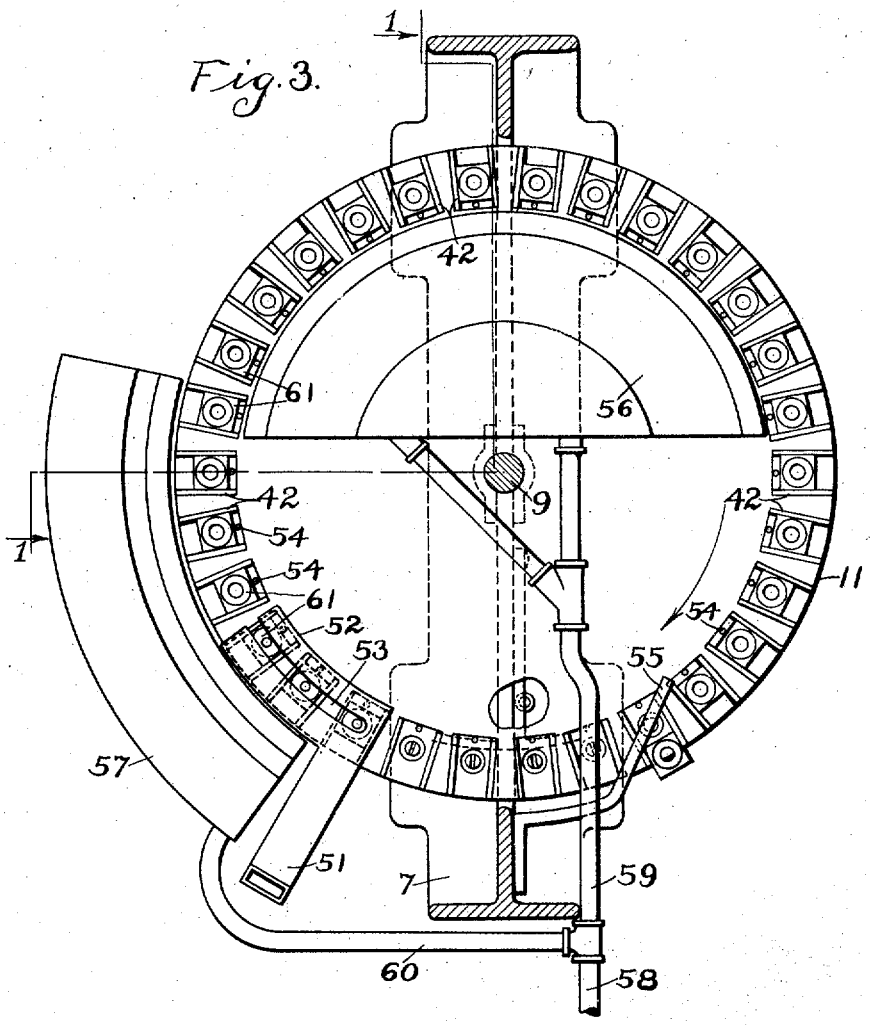
Figure 3 is a section taken on the line 3—3 of Figure 1.

As shown in Figures 1, 2 and 3, we provide a feed chute 51 for the nuts to be tapped, an extension 52 being provided thereon for nut guidance and slotted at 53 to allow the downward passage of the taps to the nuts, a pin 54 limiting the movement of said nuts toward the center of the machine, and a suitable spring, not shown, forcing the nuts against their corresponding pins, said spring being within the chute extension, and this extension is made of a length insuring tap engagement with a nut before the nut leaves said extension, after which the nuts are held in position by the respective taps.

At 55, Figure 3, is shown an arm which is arranged slightly above the horizontal plane of the upper surfaces of the nut blocks 42, as clearly shown in Figure 2, but lower than the upper surfaces of the nuts, and this arm tends to force the nuts outwardly from their resting places, away from the machine, after having been tapped.

We also provide a lubricant reservoir 56, partially shown in Figures 1 and 3, on the inner side of the taps 39 and having a suitable spout for directing lubricant upon the nuts being tapped, as many spouts as are desirable being employed. and we also provide an exterior reservoir 57 for the same purpose, said reservoirs being connected with a supply pipe 58 by means of pipes 59 and 60, respectively.

The untapped nuts, shown at 61, are fed through the chute 51 and to their respective seating blocks 42 and are carried along with the carrier 11, but the carrier 10 moves therewith, with the result that the spindles 29 are successively moved downwardly because of the cam 24 to move the taps 39 into the corresponding nuts; the spur-gear 16 is meanwhile revolving in an opposite direction, resulting in the rapid rotation of the spindles and taps, and thus cutting the threads in the respective nuts.

When the thread of a nut has been completed the carriers 10 and 11 carry the nut and tap through an arc of a circle which brings them under a cam 62 adjustably hung from the support 22, the top of the rod 30 in the spindle being forced downwardly upon contact with this cam, and the tap is released from its clutch and falls into the tube 44; immediately thereafter, the arm 55 strikes against the inner side of the tapped nut and forces it out of the machine and into a suitable receptacle not shown; when the nut has been removed, the roller 47 of the tap carrying tube 44 strikes against the cam 49 and said tube is forced upwardly and thereby forces the tab back into its clutch, the members 37 and 38 thereof yielding because of their springs 41; the roller 47 then leaves the cam 49 and impinges on the cam 50 which moves the tube 44 downwardly into initial position; at the same time, the roller 35 on the spindle strikes the rise of the bridging cam 25 and is carried upwardly into initial position, and into contact with the cam 24, the tap now being ready for another nut which will be seated beneath said tap by the time it is again forced downwardly by the cam 24, and this operation is repeated for all the spindles and taps, of which there may be any number, but corresponding to the number of nut seating blocks 42.

In the event of a shortage of taps, or the absence of several from the machine, the corresponding blocks 42 may be removed, turned upside down, and replaced, thus blocking off the exit from the nut chute 51, and no nuts are fed thereto; in Figure 2 we have shown a spring 63 for the cam 49, said cam being pivoted at 64, whereby it may yield slightly to the pressure of the rollers 47. It will thus be seen that each of a plurality of nuts are successively engaged, a tap forced therethrough, and thrown from the machine, and said machine receives said taps and returns them to initial positions, automatically, and continuously, and, while we have shown the nuts as carried in a horizontal plane, they might just as readily be carried in a vertical or in an inclined plane, very little change being required over the details of construction shown. Our invention is simple, though highly efficient, designed for nuts of various sizes, for taps of different sizes, and for different pitches of screw-threads, it being necessary to change the degree of inclination of the cam 24 for different screw pitches, and this is easily possible because of the adjustable hangers, the approximate adjustment being secured by loosening the bolt in the slots thereof, and the accurate adjustment by means of the screws above said hangers, but other means may be employed, as well as other changes in the details shown and described.

With a reservation to ourselves of all such changes as will come within the scope of the following claims, what we do claim as new, and desire to secure by Letters Patent, is:—

1. A nut tapping machine, comprising a support, a revoluble nut carrier, means for engaging each of a plurality of nuts thereon, a spindle carrier, a rotating spindle over each nut, means for revolving said carriers simultaneously, a tap held in each spindle, positive means for forcing said spindles downwardly to force said taps into nut engagement, a slidable rod in each spindle projecting thereover and resting on the tap, and a cam for forcing said rods downwardly successively to force the corresponding taps out of said spindles.

2. A nut tapping machine, comprising a support, a revoluble nut carrier, means for engaging each of a plurality of nuts thereon, a revolving spindle carrier, a rotating spindle therein over each nut, a tap in each spindle, a cam for forcing said spindles downwardly to carry said taps into nut engagement, a slidable rod in each spindle projecting thereover and bearing on the tap, and a cam for forcing said rods downwardly successively to force the corresponding taps out of said spindles.

3. A nut tapping machine, comprising a support, a revoluble nut carrier, means for engaging each of a plurality of nuts thereon, a spindle carrier, means for revolving the same, a rotating spindle over each nut, a tap in each spindle, a cam for forcing said taps into nut engagement, a rod slidable in each spindle projecting thereover and resting on the tap, a cam for forcing said rods downwardly successively to force the corresponding taps out of said spindles, and means for returning said taps to said spindles.

4. A nut tapping machine, comprising a support, a revoluble nut carrier thereon, means for holding each of a plurality of nuts thereon, a revoluble spindle carrier, a plurality of rotating spindles therein, a tap in each spindle over the corresponding nut, a cam for forcing said taps into nut engagement, a cam for forcing said taps out of said spindles and clear of the respective nuts, a tubular receiver for each tap beneath each nut, means for removing the tapped nuts from their carrier, and a cam for raising said receivers successively to return said taps to their respective spindles.

5. In a nut tapping machine, the combination of a support, a revoluble spindle carrier thereon, a plurality of rotatable spindles carried thereby, each spindle having tap holding and tap ejecting members therein, one of said members being capable of movement relatively to the other during tap ejectment, a nut carrier, and an actuating device disposed out of the path of spindle movement and adapted at a predetermined point in the revolution of the carrier to engage the movable member whereby the tap is forced out of the holding member and through the nut as the carrier revolves.

6. In a nut tapping machine, the combination of a support, a revoluble spindle carrier thereon, a plurality of rotatable spindles carried thereby, each spindle having tap holding and tap ejecting members therein, one of said members being capable of substantially vertical movement in the spindle relatively to the other during tap ejectment, a nut carrier, and an actuating member disposed out of the path of spindle movement and adapted at a predetermined point in the revolution of the carrier and its spindles to engage the movable member whereby said ejecting member acts to force the tap out of the holding member and through the nut as the carrier and its spindle revolves, and means for returning the tap to said clutch.

7. In a nut tapping machine, the combination with a tap holder, of a nut supporting table provided with an extended vertical slideway arranged below said holder and depending from the plane of nut support, and a tubular tap receiver normally positioned in said slideway for guided movement therein toward and from said tap holder, said tap receiver being constructed to support the tap in a true vertical relation with reference to the clutch of the tap holder.

8. In a nut tapping machine, the combination of a tap holder, a revoluble nut supporting table provided with an extended slideway depending from said table and having its upper end terminally located in the plane of nut support and below the tap holder, and a tubular tap receiver mounted in the lower end of said slideway for guided movement toward and from said tap holder, and actuating means for said receiver, said tap being supported in said receiver during its actuation in true relation with reference to the clutch of the tap holder.

9. In a nut tapping machine, the combination of a revoluble spindle carrier having rotatable spindles carried thereby, each spindle having tap holding and tap ejecting members and one of said members being relatively movable to the other during tap ejectment, and an abutment arranged and adapted at a predetermined point in the revolution of the carrier to engage and move the movable member whereby the tap is forced out of the holding member, and means disposed above the holding member for returning the movable member to its normal position in the spindle.

10. In a nut tapping machine, the combination of a tap holder, a nut carrier having a vertical slideway below said holder, a nut receiving block detachably mounted on said carrier, and formed with an aperture adapted to register with the slideway, a nut positioning abutment disposed adjacent said aperture, and a tap receiver having guided movement in said slideway toward and from said aperture.

11. In a nut tapping machine, the combination with the tap holder and tap, of a nut carrier having a vertical slideway below said holder, a nut receiving block having an aperture in register with the upper end of the slideway opening and a nut positioning abutment disposed at one side of said aperture, and a tap receiver movable in said slideway and through said aperture.

12. In a nut tapping machine, the combination of a revoluble spindle carrier, spindles carried thereby, an inclined track for said spindles, means for rotating the spindles, each spindle having a clutch and a tap in each clutch and being provided with an antifriction roller engaging said track and a tap ejecting rod member disposed out of the path of said roller, and means adapted to coöperate with said tap ejecting member at a predetermined point in the revolution of the spindle carrier to force the tap out of the clutch.

13. In a machine of the character described, the combination of a revoluble spindle carrier, a tap holder having its spindle rotatively carried by said carrier, an over head track constructed for depressing said spindle during carrier revolution, said spindle extending toward said track and provided with a track engaging bearing member within which the spindle rotates, and a tap ejecting device extending in said spindle and said bearing member.

14. In a machine of the character described, the combination with a revoluble spindle carrier and a track, of a spindle rotatively carried by said carrier having a clutch and a tap and provided with a track engaging member in which the spindle rotates, and a positive acting tap ejecting member in said spindle extending beyond said track engaging member.

15. In a machine of the character described, the combination of a revoluble spindle carrier, spindles carried thereby, each spindle having a tap holding device and a tap and provided with a tap ejecting member, said tap ejecting member adapted to force the tap out of the holder, means for simultaneously revolving the carrier and rotating the spindles, a downwardly inclined track engaged by the spindles whereby the taps are progressively advanced in their corresponding nuts, the inclination of the track being continued to a point where the nuts are successively tapped as the carrier revolves, and an actuating member so positioned that as a spindle passes said point the tap ejecting member is positively actuated to force the tap out of the holder and through the nut.

16. A nut tapping machine comprising revoluble spindle and nut carriers, rotatable spindles carried by said spindle carrier and each having a tap holder and a tap, tap receivers slidable in said nut carrier, a track engaged by said spindles for progressively advancing the taps in their corresponding nuts to tap the nuts, said track inclining downwardly to a point where the nuts are tapped, positively acting means for ejecting the taps out of the holder and through the nut and into a receiver, means for discharging the tapped nuts, and means coöperating with the receivers for replacing the taps in their respective holders, all of said means being positioned to successively operate as the spindles pass said point in the revolution of the carrier.

17. In a nut tapping machine, the combination of a nut supporting table having a depending slideway member and a tap receiving member slidable therein, one of said members being formed with a substantially vertical slot in its side wall and the other with an abutment disposed in said slot, substantially as described.

18. In a nut tapping machine, the combination of a tap holder and its tap, a nut supporting member formed with a vertical slideway below the holder, a tap receiver capable of guided movement in said slideway toward the holder and provided with a transverse abutment designed for engagement by said tap to position said tap during its movement with the receiver toward the clutch of the tap holder.

19. In a machine of the character described, the combination of a revoluble spindle carrier, a tap holder having its spindle rotatively mounted in the carrier, an overhead track constructed for depressing said spindle during carrier revolution, and a non-rotative bearing member within which the spindle rotates, said bearing member being provided with a track engaging roller disposed at one side of the spindle axis, and a pressure device for said bearing member adapted to maintain the roller in operative relation with the overhead track.

20. In a nut tapping machine, the combination of a frame, a revoluble spindle carrier therein, a plurality of rotatable spindles carried thereby, an overhead track constructed for depressing said spindles during carrier revolution, each of said spindles provided with a tap holding member and a relatively movable tap ejecting member and having an upper track engaging bearing device, the spindles being axially disposed to one side of the plane of track engagement, and an actuating device disposed out of the path of spindle movement and adapted to successively engage the tap ejecting members of each of the taps as the carrier revolves to force the tap out of the holding member and through the nut, substantially as described.

In testimony whereof we have signed our names and affixed our signatures in the presence of the subscribing witnesses.

THOMAS MARION DANIELS.
JULIUS C. HOLSCHEMACHER.

Witnesses:
JULIUS J. AUGUSTUS,
HENRY HERMES.